United States Patent

Lanier, Jr. et al.

[11] Patent Number: 5,795,361
[45] Date of Patent: Aug. 18, 1998

[54] FILTER CONFIGURATION

[75] Inventors: Roland Vann Lanier, Jr., Belmont; Gregory Keith Rhyne, Denver, both of N.C.

[73] Assignee: Dana Corporation, Toledo, Ohio

[21] Appl. No.: 615,164

[22] Filed: Mar. 12, 1996

[51] Int. Cl.⁶ ............................................. B01D 46/052
[52] U.S. Cl. .................. 55/502; 55/497; 55/501; 55/500; 55/DIG. 31
[58] Field of Search .................. 55/502, DIG. 31, 55/497, 499, 495, 501, 511, 521

[56] References Cited

U.S. PATENT DOCUMENTS

| | | | |
|---|---|---|---|
| 2,792,906 | 5/1957 | Evans | 55/502 |
| 3,397,518 | 8/1968 | Rogers | 55/562 |
| 3,408,438 | 10/1968 | Staunton | 55/DIG. 31 |
| 3,581,478 | 6/1971 | Smith | 55/511 |
| 3,865,919 | 2/1975 | Pall et al. | 55/486 |
| 4,725,296 | 2/1988 | Kurotobi | 55/502 |
| 4,734,113 | 3/1988 | Takagi et al. | |
| 4,885,015 | 12/1989 | Goulet et al. | 55/502 |
| 4,929,263 | 5/1990 | Kasugai | 55/502 |
| 4,961,762 | 10/1990 | Howeth | 55/502 |
| 4,963,171 | 10/1990 | Osendorf | 55/502 |
| 5,618,324 | 4/1997 | Sommer et al. | 55/497 |

Primary Examiner—Jay H. Woo
Assistant Examiner—Robert Hopkins
Attorney, Agent, or Firm—Millen, White, Zelano, & Branigan, P.C.

[57] ABSTRACT

In a filter element, such as an air filter element used for filtering engine air or cabin air in vehicles, a pleated filter media is disposed within a plastic frame and retained therein by the same material which is used to form a gasket for sealing with a housing in which the filter element is mounted. The gasket is formed of polyurethane foam or any other flexible sealing material such as plastisol or silicone and is cast molded around the outer periphery of the frame over a plurality of interlocking tabs. The seal is therefore mechanically locked to the frame as well as being adhered to the frame.

18 Claims, 4 Drawing Sheets

FILTER CONFIGURATION

FIELD OF THE INVENTION

The present invention relates to filter configurations. More particularly, the present invention relates to filter configurations for filters which employ a filter media mounted in a frame, wherein the frame is mounted in a housing through which a gas to be filtered, such as air, flows.

BACKGROUND OF THE INVENTION

Filters having a pleated filter media are used for many purposes, such as, for example, to filter gases, such as air, and liquids such as lubricating oil and coolant liquid for automotive applications. Air filters are employed in vehicles to filter both air for internal combustion engines and cabin air. Air filters are also used for applications such as clean rooms, stationary equipment and HVAC applications. Many of the air filters used to filter engine intake air and cabin air are rectangular in shape and utilize a relatively rigid plastic frame to support a pleated filter media. The frame is usually sealed within an air inlet with a peripheral gasket. In accordance with one approach, the peripheral gasket is resiliently mounted on a peripheral flange projecting from the frame and only serves to provide a hermetic seal around the filter element. The filter media is separately sealed with respect to the frame. This configuration is relatively expensive to manufacture and requires inspection to ensure that flash does not become deposited on the filter media. In addition, since the gasket is separate from the frame, the gasket must be adhered to the frame which requires the use of adhesives. In some prior art arrangements, it is necessary to have a center wall in the frame in order to stabilize the pleats of the filter media making it also necessary to seal the cores of the pleats with respect to the center wall as well as with respect to the inner peripheral wall of the frame. Since hundreds of thousands of these air filters are manufactured per year, modifications of existing structures to reduce costs can save millions of dollars in production expense. Accordingly, it is desirable to modify existing air filter configurations, used mainly for vehicular applications, in a way which substantially reduces the cost of air filter elements while maintaining the quality and structural integrity of these elements.

SUMMARY OF THE INVENTION

It is a feature of the present invention to provide a new and improved configuration for air filter elements wherein the air filter elements cost substantially less to manufacture while their structural integrity and quality are maintained.

With these features and other features in mind, the present invention is directed to an air filter element for mounting in a filter housing wherein the air filter element comprises a frame defining a space of a selected area and shape. The frame has a first side and a second side with the second side having inwardly extending support surfaces for a filter media and the first side defining an opening corresponding to the selected area and shape. The frame includes laterally extending flanges projecting outwardly therefrom. A pleated filter media, configured as a continuous panel having an area and the complementing that defined by the frame, is received within the frame. Upon being mounted in the frame, the pleated filter media abuts the inwardly extending support surfaces at the second side of the frame. A sealing gasket is molded around the frame and over the laterally extending flanges. The sealing gasket has a portion laterally extending over the inner periphery of the first side of the frame so as to overlie a peripheral portion of the pleated filter media to thereby seal the pleated filter media in the frame as well as to provide a gasket and peripheral mounting surface for retaining the filter element within the filter housing.

In accordance with a further aspect of the invention, the laterally extending flanges are tabs spaced apart from one another and distributed around the periphery of the frame. In still further aspects of the invention, the tabs spaced from both the first and second sides of the frame extend to interlock with the seal.

In still further aspects, the material of the gasket is selected from the group of materials consisting of polyurethane foam, plastisol, and silicone.

BRIEF DESCRIPTION OF THE DRAWINGS

Various other features and attendant advantages of the present invention will be more fully appreciated as the same becomes better understood when considered in conjunction with the accompanying drawing, in which like reference characters designate the same or similar parts throughout the several views, and wherein.

DETAILED DESCRIPTION

Figure 1:
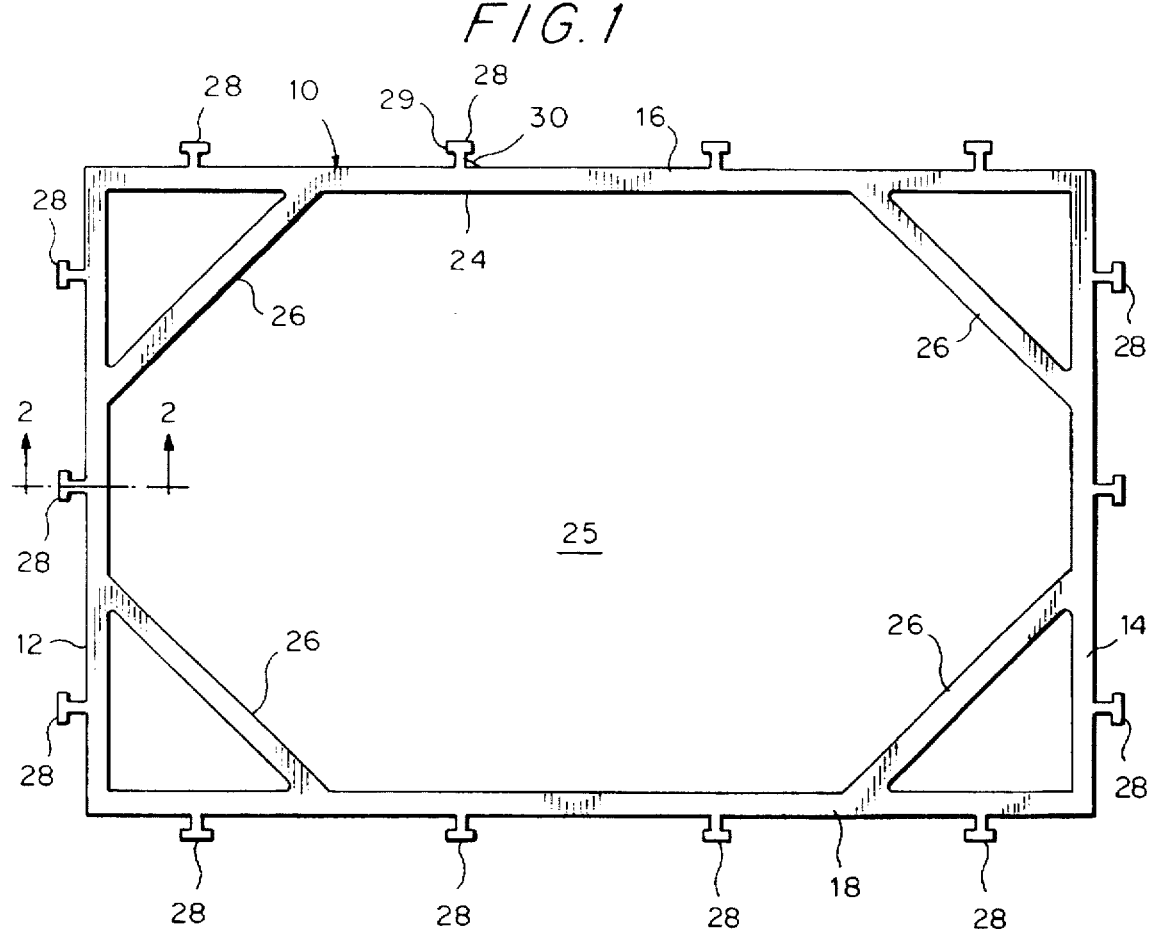
FIG. 1 is a front view of a frame configured in accordance with the present invention for supporting a filter media to provide a filter element.
Figure 2:
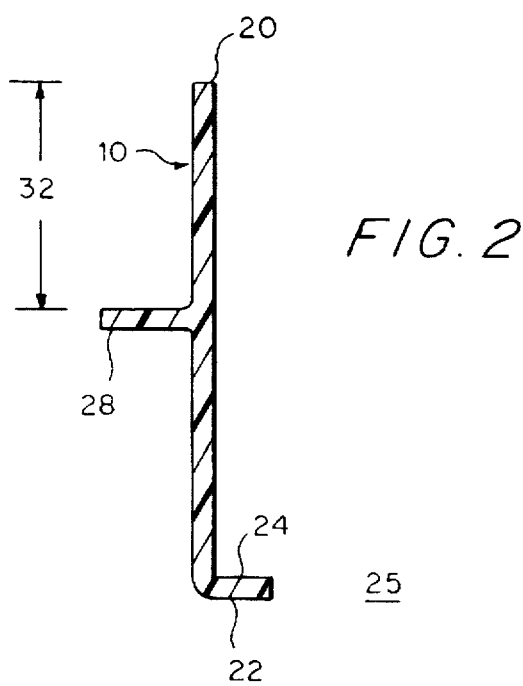
FIG. 2 is a side elevation taken along lines 2—2 of FIG. 1.
Figure 3:
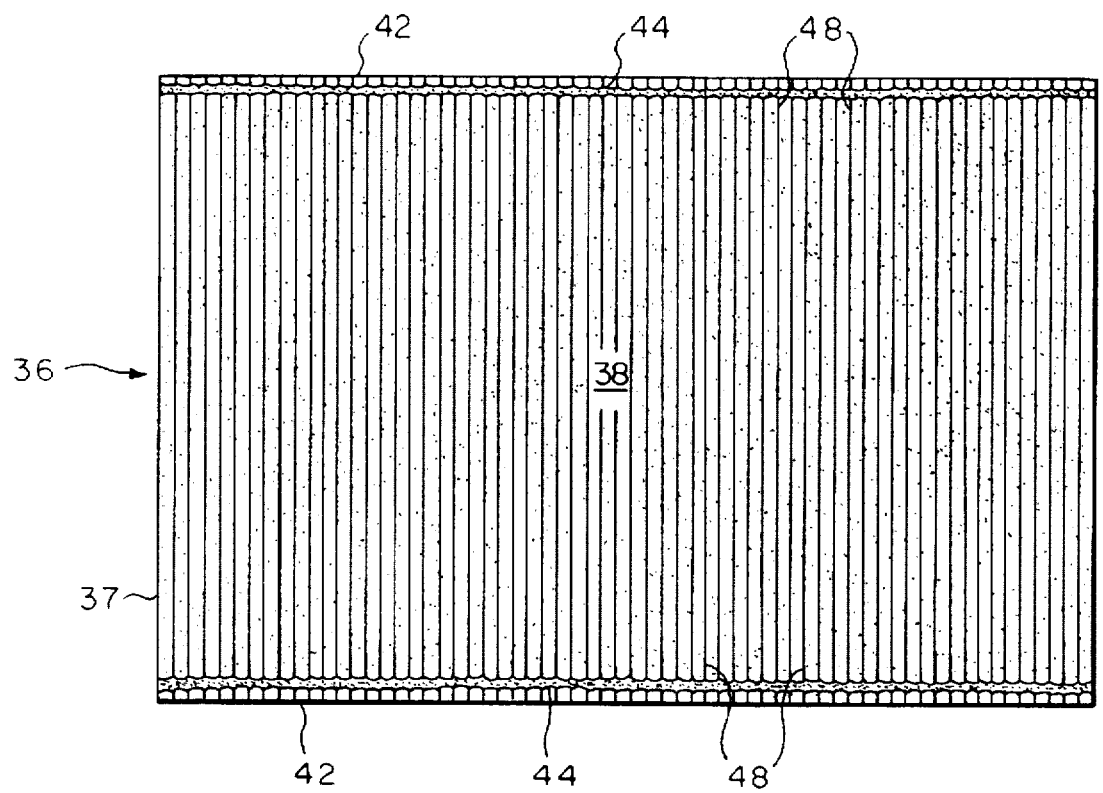
FIG. 3 is a top view of a filter media block for mounting in the frame of FIG. 1.
Figure 4:
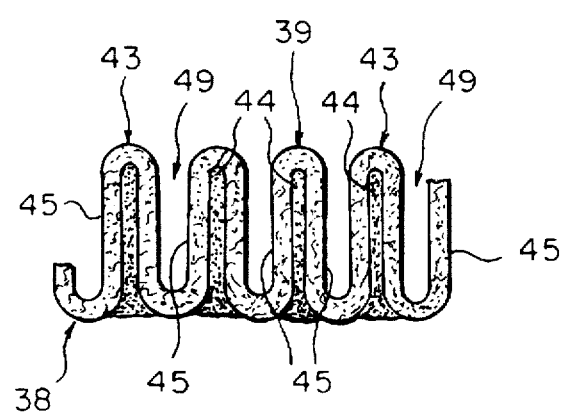
FIG. 4 is a side view of a portion of the filter media block of FIG. 3.
Figure 5:
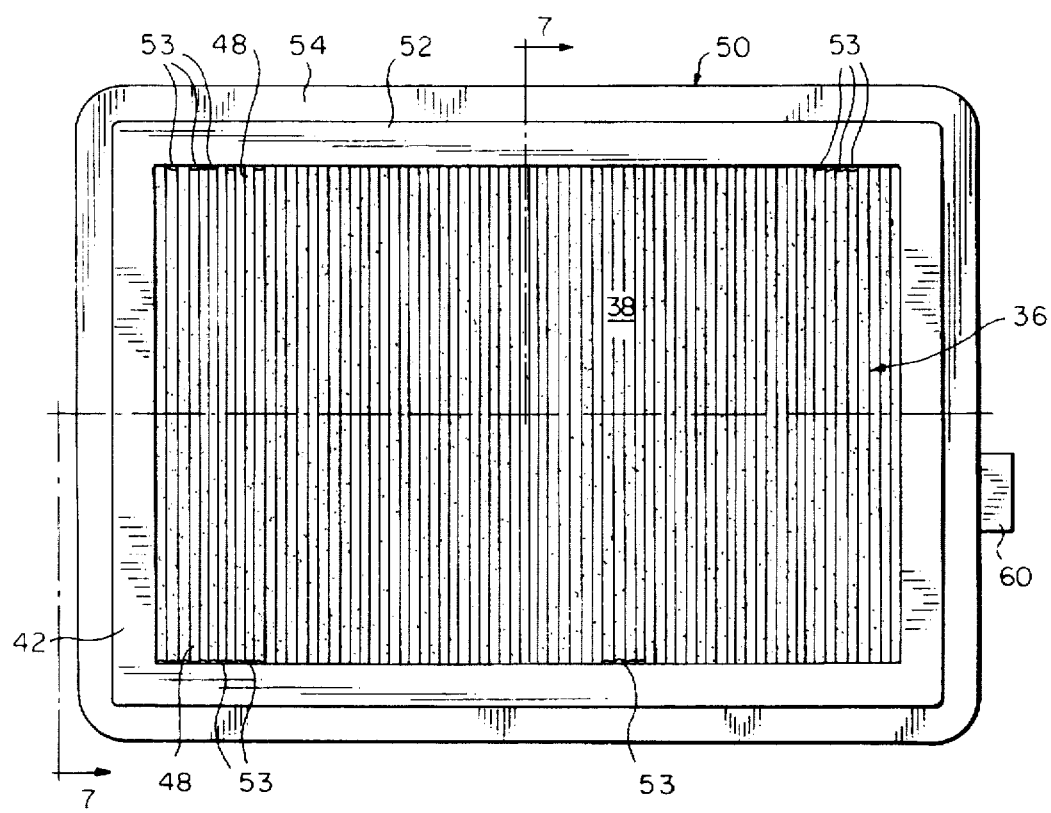
FIG. 5 is a front view of a filter element showing the first side in which the filter media of FIGS. 3 and 4 is retained in the filter frame of FIG. 1.
Figure 6:
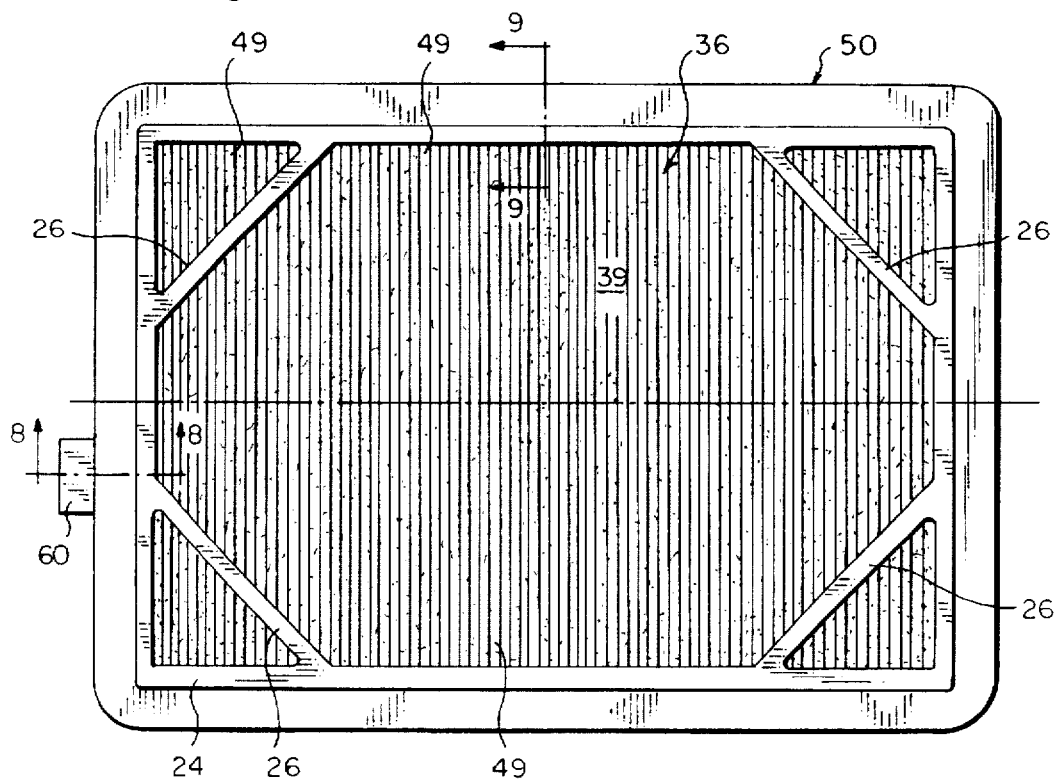
FIG. 6 is a rear view of the filter element of FIG. 5 showing the second side.
Figure 7:
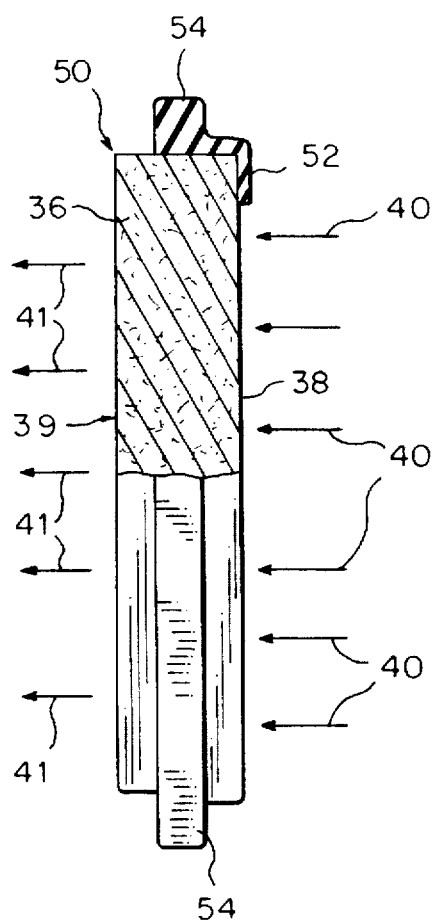
FIG. 7 is a side view, partially in elevation, of the filter element of FIGS. 5 and 6 taken along lines 7—7 of FIG. 5.

Referring now to FIGS. 1 and 2, there is shown a plastic filter frame 10, configured in accordance with the principles of the present invention, which is used to retain the filter media shown in FIGS. 3 and 4 to configure the filter element of FIGS. 5-7. The plastic filter frame 10 includes a pair of opposed short side walls 12 and 14 and a pair of opposed long side walls 16 and 18, which walls provide the frame 10, which defines a space of a selected area and, in one embodiment, a rectangular shape. While a rectangular shape is preferred, the frame can be of other configurations, e.g., round or otherwise polygonal such as, for example, pentagonal or hexagonal. The frame 10 has a first side 20 and an second side 22. In a preferred embodiment of the invention, the first side 20 faces the airstream flow and is the dirty side of the filter element while the second side 22 faces away from the airstream flow and is the clean side of the filter. In another embodiment of the invention, the side 22 faces the airstream flow and the second side 20 faces away from the airstream flow. At the second side 22 of the filter frame 10, the walls of the frame include a shelf 24 which extends around the inner periphery of the frame to define a second opening 25. In addition to the shelf 24, in accordance with a preferred embodiment, there are four corner supports 26, each of which is disposed at a 45° angle with respect to short walls 14 and 12 and the long walls 16 and 18.

Disposed between the first side 20 and second side 22 of the filter frame 10 are a plurality of T-shaped tabs 28, each of which have a cross piece 29 attached to a strut 30 that secures each T-shaped tab to its respective side wall 12, 14, 16 or 18 with the cross piece extending in the direction of the side wall. Each T-shaped tab 28 is spaced a distance 32 from the first side 20 of the filter frame 10. While T-shaped tabs 28 are presently preferred, it is within the scope of this invention for the tabs to have other shapes such as, for example, L- or U-shapes.

Referring now to FIGS. 3, 4 and 7 there is shown a rectangular filter media 36 which has a size and shape which complements that of the space defined by the frame 10, but is slightly larger than the first opening 25 defined by the shelf 24. The corner braces 26, which are co-planar with the shelf 24, decrease very slightly the area of the second opening 25 of the frame 10 and cooperate with the shelf 24 to provide a support for the filter media block 36. The filter media block has a thickness 37 which is substantially equal to the height of the side walls 12, 14, 16 and 18 of the frame 10. The filter media block 36 has a first face 38 upon which the air to be filtered impinges and a second face 39 which provides the clean side of the filter. In other words, an unfiltered airstream flowing in the direction of arrows 40 impinges on and passes through the first face 38, then passes through the pleats of the filter media block 36 and exits as a clean air stream 41 from the second face 39. As is seen in FIGS. 3 and 4, the edge portions 42 of each pleat 43 are sealed with an adhesive 44 prior to molding to the frame. More specifically, the pleated filter media block 36 is comprised of a plurality of adjoining panels 45 folded in accordian fashion to form the pleats 43. The adjoining panels 45 each have opposed edge portions which are bonded to one another with the adhesive 44 to form alternating oppositely opening pockets 48 and 49 that open in the first and second faces 38 and 39, respectively.

Referring now to FIGS. 5–9, it is seen that the filter media block 36 is mounted within the frame 10 to provide a filter assembly 50. As is seen in FIG. 6, the second face 39 of the filter media block 36 rests against both the corner supports 26 and the shelf 24. The filter media block 36 is nested in the frame 10 prior to securing the first face 38 with respect to the frame.

In accordance with the present invention, the filter media block 36 is secured at the first face 38 to the frame 10 by a sealing lip 52 which is unitary with a peripheral gasket 54 that extends completely around the frame 10. The gasket 54 and the sealing lip 52 are formed simultaneously by cast molding of polyurethane foam or any other type of suitable, flexible sealing material such as, for example, plastisol or silicone. The lip 52 overlies a peripheral portion of the first face 38 of the pleats 43 and bonds with both the plastic frame 10 and the pleats of the filter media panel 36 in order to provide a peripheral seal. The material of the lip 52 forms beads 53 that fill small portions of voids between the pockets 48 of the filter media block 36 so that the filter media is sealed at its periphery as well as fixed to the frame 10.

Figure 8:
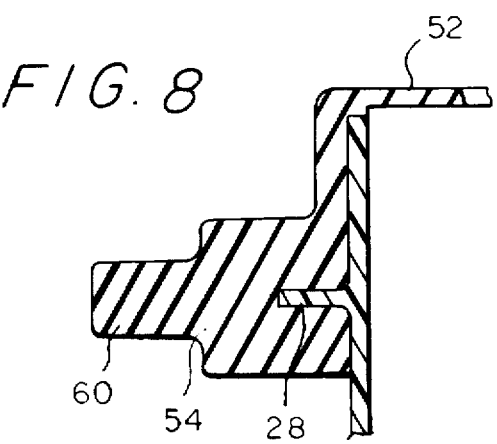
FIG. 8 is an enlarged side elevation illustrating a sealing gasket configured in accordance with the principles of the present invention taken along lines 8—8 of FIG. 6 showing an optional orienting tab.
Figure 9:
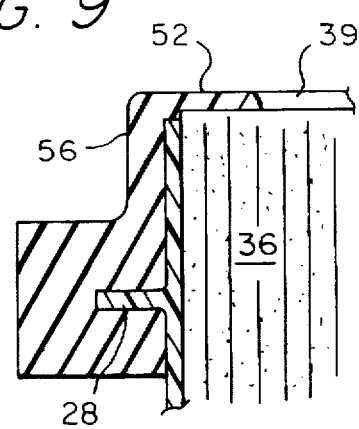
FIG. 9 is an enlarged side elevation of the sealing gasket taken along lines 9—9 of FIG. 6.

The T-shape tabs 28 are enveloped by the gasket 54 and serve to permanently retain the gasket on the frame 10. The gasket 54 bonds over a considerable area with the frame 10 because it includes a web 56 that joins the gasket to the lip 52, which web is bonded to the outer surface of the frame walls 12, 14, 16 and 18 as is seen in FIGS. 7, 8 and 9.

In order to properly orient the filter assembly 50 when it is mounted, an optional orienting tab 60 projects from the gasket 54. The orienting tab 60 is molded unitarily with the gasket 54.

The filter assembly 50 has essentially three parts: the plastic frame 10, the filter media panel 36 and the sealing gasket 54 which has a sealing lip 52 that retains the filter media panel within the frame. With the aforedescribed arrangement, the expense of producing filters such as engine air filters and cabin air filters is substantially reduced. This is accomplished by eliminating the need for an adhesive for adhering the gasket 54 to the frame 10 while, at the same time, enhancing circumferential stiffness of the filter element 50. The lip 52 provides a leak-proof seal between the plastic frame 10 and the filter media panel 36 while the arrangement allows for the use of a pocket pleated media as opposed to individually sealed cores on each pleat, which is the prior art arrangement for such filters. The pocket pleat adhesive side can be turned in either an upstream or downstream orientation while the paper seal line and the mold break line are in different planes so as to prevent flash from the mold break line from depositing itself to the surface of the media.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A filter element for mounting in a filter housing, the filter element comprising:

a frame having an extent defining a space of a selected area and shape, the frame having a first side and a second side, the second side being open and having inwardly extending support surfaces extending from an outer wall surface of the frame and the first side defining an opening corresponding to the selected area and shape, the first and second sides having parallel extents;

laterally extending flanges projecting outwardly from the frame in a direction parallel to the extent of the first and second sides of the frame;

pleated filter media configured as a continuous block having an area and shape complementing that defined by the frame and being received in the frame, the pleated filter media abutting the inwardly extending support surfaces; and a sealing gasket of sealing material molded around the outer wall surface of the frame and over the laterally extending flanges, the sealing gasket having an overlapping lip portion extending past the inner periphery of the first side of the frame and overlying a peripheral portion of the pleated filter media to adhere the pleated filter media in the frame and to provide a gasket and peripheral mounting surface for retaining the filter element within a housing, the sealing gasket having portions beneath the lip and extending between the pleats to seal the edges of the filter media to ensure that fluid being filtered passes through the filter media.

2. The filter element of claim 1, wherein the laterally extending flanges are tabs spaced apart from one another and distributed around the periphery of the frame.

3. The filter element of claim 2, wherein the tabs are spaced from both the first and second sides of the frame.

4. The filter element of claim 3, wherein the tabs are T-shaped.

5. The filter assembly of claim 4, wherein the material of the gasket is selected from the group consisting of polyurethane foam, plastisol and silicone.

6. The filter assembly of claim 1, wherein the frame is plastic.

7. The filter assembly of claim 6, wherein the frame and block configured of the filter media are rectangular and wherein the support surfaces of the frame comprise a peripheral shelf.

8. The filter assembly of claim 7 further including supports extending between walls of the frame, the supports providing support surfaces for the filter media in addition to the peripheral shelf.

9. The filter element of claim 8, wherein the laterally extending flanges are tabs spaced apart from one another and distributed around the periphery of the frame.

10. The filter element of claim 9, wherein the tabs are spaced from both the first and second sides of the frame.

11. The filter element of claim 10, wherein the tabs are T-shaped.

12. The filter assembly of claim 11, wherein the material of the gasket is selected from the group consisting of polyurethane foam, plastisol and silicone.

13. The filter assembly of claim 8, wherein the supports are corner supports extending between adjoining walls of the frame.

14. The filter assembly of claim 1, wherein the pleated filter media is comprised of a plurality of adjoining panels folded in accordian fashion and having opposed edge portions which are bonded to one another to form alternating oppositely opening pockets.

15. The improvement of claim 14, wherein the opposing panels are bonded to one another by adhesive.

16. The improvement of claim 15, wherein beads of the sealing material extend between the pleats adjacent the overlapping lip portion of the sealing gasket.

17. The filter assembly of claim 16, wherein the material of the gasket is selected from the group consisting of polyurethane foam, plastisol and silicone.

18. The filter assembly of claim 17, wherein the frame is plastic.

* * * * *